United States Patent
Wang et al.

(10) Patent No.: US 12,439,467 B2
(45) Date of Patent: Oct. 7, 2025

(54) TECHNIQUES FOR POST-CALL SERVICE RECOVERY IN DUAL SIM USER EQUIPMENT

(71) Applicant: QUALCOMM INCORPORATED, San Diego, CA (US)

(72) Inventors: Dongsheng Wang, Beijing (CN); Chaofeng Hui, Beijing (CN); Guojing Liu, Beijing (CN); Xiaomeng Lu, Shanghai (CN); Zongyou Xia, Beijing (CN); Xuesong Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/914,892

(22) PCT Filed: May 19, 2020

(86) PCT No.: PCT/CN2020/090984
§ 371 (c)(1),
(2) Date: Sep. 27, 2022

(87) PCT Pub. No.: WO2021/232221
PCT Pub. Date: Nov. 25, 2021

(65) Prior Publication Data
US 2023/0133784 A1    May 4, 2023

(51) Int. Cl.
*H04W 76/16* (2018.01)
*H04W 8/18* (2009.01)
*H04W 48/16* (2009.01)

(52) U.S. Cl.
CPC ........... *H04W 76/16* (2018.02); *H04W 8/183* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 9,066,330 B2 | 6/2015 | Hang et al. | |
| 9,491,276 B2 | 11/2016 | Kanamarlapudi et al. | |
| (Continued) | | | |

FOREIGN PATENT DOCUMENTS

| | | | |
|---|---|---|---|
| CN | 105611588 A | 5/2016 | |
| CN | 109863766 A | 6/2019 | |
| (Continued) | | | |

OTHER PUBLICATIONS

International Search Report and Written Opinion—PCT/CN2020/090984—ISA/EPO—Feb. 19, 2021.
(Continued)

*Primary Examiner* — German Viana Di Prisco
(74) *Attorney, Agent, or Firm* — Holland & Hart LLP

(57) ABSTRACT

Methods, systems, and devices for wireless communications are described. A user equipment (UE) may establish a first wireless connection associated with a first subscription using a first radio access technology, and may establish a second wireless connection associated with a second subscription using a second radio access technology. The UE may perform a call over the second wireless connection, and identify a loss of the first wireless connection based on performing the call over the second wireless connection. The UE may perform a network discovery procedure associated with the first subscription using the first radio access technology based on the loss of the first wireless connection and a termination of the call over the second wireless connection.

27 Claims, 10 Drawing Sheets

(56) References Cited

U.S. PATENT DOCUMENTS

| | | | |
|---|---|---|---|
| 2015/0312408 A1 | 10/2015 | Shi et al. | |
| 2018/0167984 A1* | 6/2018 | Krishnamoorthy | ... H04W 76/36 |
| 2018/0176887 A1 | 6/2018 | Strobl | |
| 2019/0110236 A1 | 4/2019 | Huang et al. | |
| 2021/0204111 A1* | 7/2021 | Jung | ... H04W 76/15 |
| 2022/0191824 A1* | 6/2022 | Kumar | ... H04W 68/02 |

FOREIGN PATENT DOCUMENTS

| | | |
|---|---|---|
| EP | 3530015 A1 | 8/2019 |
| WO | WO-2012089596 A1 | 7/2012 |
| WO | WO-2015047834 | 4/2015 |
| WO | WO-2016164149 | 10/2016 |

OTHER PUBLICATIONS

Supplementary European Search Report—EP20936947—Search Authority—Munich—Jan. 15, 2024.

Vivo (Moderator): "Report of Phase 1 Multi-SIM Email Discussion", 3GPP TSG-RAN WG Meeting #85, RP-191898, 3rd Generation Partnership Project, Mobile Competence Centre, 650, Route Des Lucioles, F-06921 Sophia-Antipolis Cedex, France, Newport Beach, USA, Sep. 16-20, 2019, Sep. 9, 2019, XP051782444, 36 Pages, figure 1.

\* cited by examiner

TECHNIQUES FOR POST-CALL SERVICE RECOVERY IN DUAL SIM USER EQUIPMENT

CROSS REFERENCE

The present Application is a 371 national stage filing of International PCT Application No. PCT/CN2020/090984 by WANG et al. entitled "TECHNIQUES FOR POST-CALL SERVICE RECOVERY IN DUAL SIM USER EQUIPMENT," filed May 19, 2020, which is assigned to the assignee hereof, and which is expressly incorporated by reference in its entirety herein.

FIELD OF TECHNOLOGY

The following relates generally to wireless communications and more specifically to techniques for post-call service recovery in dual SIM user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a dual-SIM user equipment (UE) may be able to support wireless connections with cells associated with a first subscription and a second subscription. In some cases, the wireless connections associated with the first subscription and the second subscription may share common UE hardware resources (e.g., common modem) as well as common radio frequency (RF) resources. Accordingly, call (e.g., voice call) performed over a second wireless connection associated with the second subscription may cause a loss of a first wireless connection associated with the first subscription. Once the call is terminated, a radio access technology acquisition procedure performed by the UE to re-establish a wireless connection associated with the first subscription may cause the UE to establish a wireless connection associated with a lower-priority radio-access technology (e.g., 3G, 2G) first, thereby delaying service recovery associated with a higher-priority radio-access technology (e.g., NR).

SUMMARY

The described techniques relate to improved methods, systems, devices, and apparatuses that support techniques for post-call service recovery in dual SIM user equipment. Generally, the described techniques provide for a dual-SIM user equipment (UE) performing (e.g., initiating or re-initiating) a network discovery procedure (e.g., radio access technology acquisition procedure) associated with a first subscription supported by the UE following the termination of a call (e.g., voice call) performed by a second subscription supported by the UE. The network discovery procedure may prioritize higher-priority radio access technologies (e.g., NR, 5G) over lower-priority radio access technologies (e.g., LTE, 3G, 2G). By initiating (or re-initiating) the network discovery procedure after termination of the call, techniques described herein may facilitate fast and efficient NR service recovery, and prevent delays associated with NR service recovery experienced by some wireless communications systems.

A method of wireless communication at a UE is described. The method may include establishing a first wireless connection associated with a first subscription using a first radio access technology, establishing a second wireless connection associated with a second subscription using a second radio access technology, performing a call over the second wireless connection, identifying a loss of the first wireless connection based on performing the call over the second wireless connection, and performing a network discovery procedure associated with the first subscription using the first radio access technology based on the loss of the first wireless connection and a termination of the call over the second wireless connection.

An apparatus for wireless communication at a UE is described. The apparatus may include a processor, memory coupled with the processor, and instructions stored in the memory. The instructions may be executable by the processor to cause the apparatus to establish a first wireless connection associated with a first subscription using a first radio access technology, establish a second wireless connection associated with a second subscription using a second radio access technology, perform a call over the second wireless connection, identify a loss of the first wireless connection based on performing the call over the second wireless connection, and perform a network discovery procedure associated with the first subscription using the first radio access technology based on the loss of the first wireless connection and a termination of the call over the second wireless connection.

Another apparatus for wireless communication at a UE is described. The apparatus may include means for establishing a first wireless connection associated with a first subscription using a first radio access technology, establishing a second wireless connection associated with a second subscription using a second radio access technology, performing a call over the second wireless connection, identifying a loss of the first wireless connection based on performing the call over the second wireless connection, and performing a network discovery procedure associated with the first subscription using the first radio access technology based on the loss of the first wireless connection and a termination of the call over the second wireless connection.

A non-transitory computer-readable medium storing code for wireless communication at a UE is described. The code may include instructions executable by a processor to establish a first wireless connection associated with a first subscription using a first radio access technology, establish a second wireless connection associated with a second subscription using a second radio access technology, perform a call over the second wireless connection, identify a loss of the first wireless connection based on performing the call over the second wireless connection, and perform a network discovery procedure associated with the first subscription using the first radio access technology based on the loss of the first wireless connection and a termination of the call over the second wireless connection.

Some examples of the method, apparatuses, and non-transitory computer-readable medium described herein may further include operations, features, means, or instructions for initiating the network discovery procedure associated with the first subscription using the first radio access technology based on the loss of the first wireless connection, where the network discovery procedure may be initiated prior to the termination of the call over the second wireless connection, and where performing the network discovery procedure based on the loss of the first wireless connection and the termination of the call over the second wireless connection includes re-initiating the network discovery procedure after the termination of the call over the second wireless connection.

Some examples of the method, apparatuses, and non-transitory computer-readable medium described herein may further include operations, features, means, or instructions for initiating an attachment attempt counter, a timer, or both, based on initiating the network discovery procedure, and performing the network discovery procedure using the second radio access technology based on the attachment attempt counter satisfying a threshold counter, the timer satisfying a threshold time duration, or both.

Some examples of the method, apparatuses, and non-transitory computer-readable medium described herein may further include operations, features, means, or instructions for resetting the attachment attempt counter, the timer, or both, based on re-initiating the network discovery procedure after the termination of the call over the second wireless connection.

Some examples of the method, apparatuses, and non-transitory computer-readable medium described herein may further include operations, features, means, or instructions for establishing a third wireless connection associated with the first subscription using the first radio access technology based on performing the network discovery procedure using the first radio access technology.

Some examples of the method, apparatuses, and non-transitory computer-readable medium described herein may further include operations, features, means, or instructions for performing an attachment procedure with a cell associated with the first subscription while operating in a stand-alone mode of operation, where establishing the first wireless connection may be based on performing the attachment procedure.

Some examples of the method, apparatuses, and non-transitory computer-readable medium described herein may further include operations, features, means, or instructions for communicating over the first wireless connection associated with the first subscription using a set of communication resources based on establishing the first wireless connection, and performing the call over the second wireless connection using the set of communication resources, where identifying the loss of the first wireless connection may be based on performing the call over the second wireless connection using the set of communication resources.

In some examples of the method, apparatuses, and non-transitory computer-readable medium described herein, the first wireless connection associated with the first subscription may be established using a set of radio frequency hardware resources of the UE, and the second wireless connection associated with the second subscription may be established using the set of radio frequency hardware resources of the UE.

In some examples of the method, apparatuses, and non-transitory computer-readable medium described herein, performing the call over the second wireless connection may include operations, features, means, or instructions for performing a voice over LTE (VoLTE) call, or a circuit-switched fallback (CSFB) call.

In some examples of the method, apparatuses, and non-transitory computer-readable medium described herein, the first radio access technology includes a new radio technology, a 5G technology, or both, and the second radio access technology includes a long term evolution technology, a 4G technology, or both.

DETAILED DESCRIPTION

Figure 1:
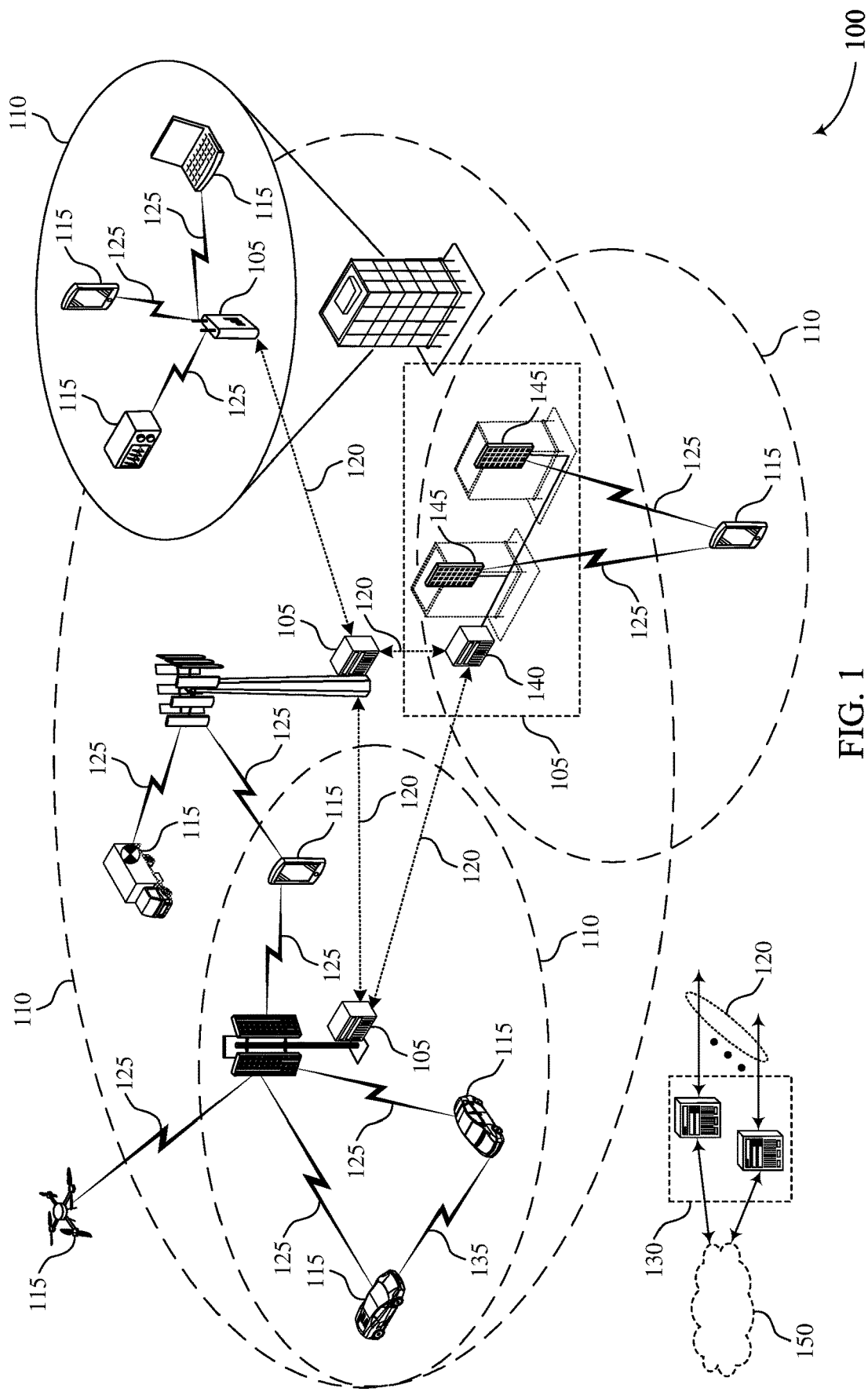
FIG. 1 illustrates an example of a wireless communications system that supports techniques for post-call service recovery in dual SIM user equipment in accordance with aspects of the present disclosure.

In some systems, a dual-SIM user equipment (UE) may support multiple subscriptions that may allow the dual-SIM UE to establish connections with multiple networks, where each subscription may support one network. In some aspects, a dual-SIM UE may be able to establish a first wireless connection associated with a first subscription using a first radio access technology (e.g., NR technology), and additionally establish a second wireless connection associated with a second subscription using a second radio access technology (e.g., LTE technology). In some cases, the wireless connections associated with the first subscription and the second subscription may share common radio frequency (RF) hardware resources (e.g., common modem) as well as common RF resources (e.g., time/frequency resources). Accordingly, in some cases, the UE may perform a call (e.g., voice call) over the second wireless connection using voice over LTE (VoLTE) or circuit switched fallback (CSFB), which may monopolize the common RF resources for the length of the call, and result and causes a timeout and loss of the first wireless connection associated with the first subscription. The UE may then perform a network discovery procedure (e.g., radio access technology acquisition procedure) associated with the first subscription using the first radio access technology (e.g., NR) to restore the first wireless connection. The network discovery procedure may first be performed using NR, and may subsequently be performed using LTE, 3G, and 2G if higher-priority connections are unable to be established. However, due to the fact that the call associated with the second subscription is utilizing the common RF resources, the first subscription of the UE may be unable to re-establish a connection while the call is ongoing. Depending on the length of the call, the first subscription of the UE may be attempting to establish a lower-priority connection (e.g., 3G connection, 2G connection) by the time the call is terminated. Accordingly, by the time the call is terminated, the first subscription of the UE may be free to use the common RF resources, and may thereby establish the lower-priority connection. Establishing this lower-priority connection may delay NR service recovery, thereby slowing call and leading to poor user experience.

To address issues associated with a delay in NR service recovery following a call, a dual-SIM UE may perform (e.g., initiate or re-initiate) a network discovery procedure (e.g., radio access technology acquisition procedure) associated with a first subscription following a termination of a call performed over a second subscription. For example, a call (e.g., voice call) associated with a second subscription and performed over a second wireless connection may utilize common RF resources, and may therefore lead to a loss of a first wireless connection associated with a first subscription. Upon termination of the call, the UE may re-initiate a network discovery procedure associated with the first subscription using the first radio access technology (e.g., NR). In this regard, by re-initiating the network discovery procedure after termination of the call when the common RF resources are available, the UE may be able to quickly establish a higher-priority connection (e.g., NR connection) associated with the first subscription. In particular, by re-initiating the network discovery procedure after termination of the call, the UE may prevent firstly establishing a lower-priority connection (e.g., LTE, 3G, 2G), which may delay NR service recovery. Accordingly, techniques described herein may enable faster and more efficient recovery of NR service following termination of a call associated with a second subscription.

Aspects of the disclosure are initially described in the context of wireless communications systems. Aspects of the disclosure are also described in the context of an example process flow. Aspects of the disclosure are further illustrated by and described with reference to apparatus diagrams, system diagrams, and flowcharts that relate to recovering user equipment from call failure in new radio.

FIG. 1 illustrates an example of a wireless communications system 100 that supports techniques for post-call service recovery in dual SIM user equipment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations of the wireless communications system 100 may support communications to enable efficient post-call service recovery in the context of dual-SIM UEs 115. In particular, the wireless communications system 100 may support communications which enable a UE 115 to perform (e.g., initiate or re-initiate) a network discovery procedure (e.g., radio access technology acquisition procedure) associated with a first subscription supported by the UE 115 following the termination of a call performed by a second subscription supported by the UE 115. The network discovery procedure may prioritize higher-priority radio access technologies (e.g., NR) over lower-priority radio access technologies (e.g., LTE, 3G, 2G). By initiating (or re-initiating) the network discovery procedure after termination of the call, techniques described herein may facilitate fast and efficient NR service recovery by the UE 115, and prevent delays associated with NR service recovery experienced by some wireless communications systems.

For example, a UE 115 may be an example of a dual-SIM UE 115, or multi-SIM UE 115. For example, UE 115 a may include a first SIM and a second SIM. The first SIM may provide a first subscription, and the second SIM may provide a second subscription. The UE 115-a may communicate with a first communications network via the first subscription and may simultaneously or contemporaneously communicate with a second communications network via the second subscription. In some cases, each network may be supported by a different base station 105, or each network may be supported by the same base station 105, or a combination thereof. For example, base station 105 of the wireless communications system 100 may support a 5G network, an LTE network, or both. In some cases, a network may refer to a cell. Thus, the base station 105 may support different cells of the same or different networks. As UE 115 is configured with two subscriptions, the UE 115 may support communications with two base stations 105 (e.g., two networks) at a time. For example, UE 115 may communicate with a base station 105-a associated with a first subscription, and may communicate with a base station 105-b associated with the second subscription.

In some aspects, the UE 115 may establish a first wireless connection associated with a first subscription using a first radio access technology. For example, the UE 115 may establish a first wireless connection with a first cell (e.g., first base station 105-a) associated with the first subscription. The first cell may be associated with a first radio access technology, such as an NR technology (e.g., NR cell). The UE 115 may additionally establish a second wireless connection associated with the second subscription using a second radio access technology. For example, the UE 115 may establish a second wireless connection with a second cell (e.g., second base station 105-b) associated with a second subscription. The second cell may be associated with a second radio access technology, such as an LTE technology (e.g., LTE cell). In some aspects, the first subscription and the second subscription supported by the UE 115 may share common RF hardware resources (e.g., common modem), common communication resources (e.g., common time resources, common frequency resources), or both.

Continuing with the same example, the UE 115 may perform a call with over the second wireless connection associated with the second subscription. For instance, the UE 115 may perform a voice call (e.g., VoLTE call, a CSFB call) with the LTE cell (e.g., second base station 105-b) supported by the second subscription. The voice call may utilize the common communication resources used by the first and second subscription, and may thereby cause a loss of the first wireless connection associated with the first subscription (e.g., loss of the first wireless connection with the first base station 105-a). The UE 115 may determine a termination of the voice call, and may initiate (or re-initiate) a network discovery procedure (e.g., radio access technology acquisition procedure) based on (e.g., following) the termination of the voice call.

In some aspects, the network discovery procedure may prioritize higher-priority radio access technologies (e.g., NR) over lower-priority radio access technologies (e.g., LTE, 3G, 2G). For example, the UE 115 may first perform the network discovery procedure using the first radio access technology (e.g., NR), and may cycle (e.g., switch) through lower-priority radio access technologies (e.g., LTE, 3G, 2G) if attempts to establish higher-priority connections are unsuccessful. By initiating (or re-initiating) the network discovery procedure after termination of the voice call, techniques described herein may enable the UE 115 to quickly and efficiently re-establish an NR connection in order to quickly recover NR service following the voice call.

Figure 2:
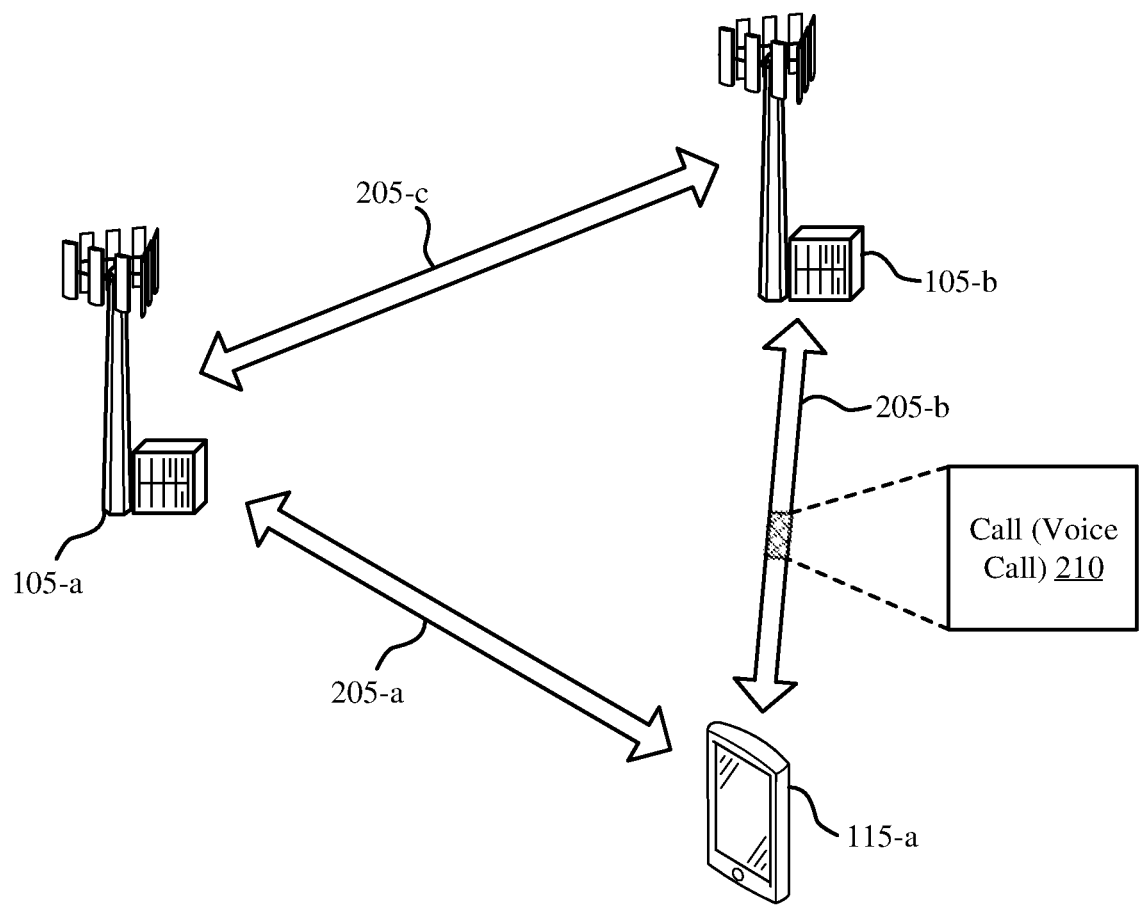
FIG. 2 illustrates an example of a wireless communications system that supports techniques for post-call service recovery in dual SIM user equipment in accordance with aspects of the present disclosure.

FIG. 2 illustrates an example of a wireless communications system 200 that supports techniques for post-call service recovery in dual SIM user equipment in accordance with aspects of the present disclosure. In some examples, wireless communications system 200 may implement aspects of wireless communications system 100. The wireless communications system 200 may include a UE 115-a, a first base station 105-a, and a second base station 105 b, which may be examples of UE 115 and base stations 105, as described with reference to FIG. 1.

The UE 115-a may communicate with the first base station 105-a using a communication link 205-a, which may be an example of an NR link (e.g., 5G link) between the UE 115-a and the first base station 105-a. Similarly, the UE 115-a may communicate with the second base station 105-b using a communication link 205-b, which may be an example of an LTE link (e.g., 4G link) between the UE 115-a and the second base station 105-b. In some cases, the communication links 205-a, 205-b may include examples of an access link (e.g., a Uu link). The communication links 205-a, 205-b may include a bi-directional link that includes both uplink and downlink communication. For example, the UE 115-a may transmit uplink signals, such as uplink control signals or uplink data signals, to the first base station 105-a using the first communication link 205-a and the first base station 105-a may transmit downlink signals, such as downlink control signals or downlink data signals, to the UE 115-a using the communication link 205-a. By way of another example, the UE 115-a may transmit uplink signals, such as uplink control signals or uplink data signals, to the second base station 105-b using the second communication link 205-b and the second base station 105-b may transmit downlink signals, such as downlink control signals or downlink data signals, to the UE 115-a using the communication link 205-b.

The first base station 105-*a* and the second base station 105-*b* may communicate with one another via a communication link 205-*c*. In some cases, the communication link 205-*c* may include an example of a link between two base stations (e.g., an Xn link). The first base station 105-*a* and the second base station 105-*b* may, in some cases, be collocated. The communication link 205-*c* may include a bi-directional link. In some aspects, the first base station 105-*a* and the second base station 105-*b* may be associated with one or more cells. For example, the first base station 105-*a* may be associated with a first cell and the second base station 105-*b* may be associated with a second cell different than the first cell. For instance, the first base station 105-*a* may be associated with an NR cell, and the second base station 105-*b* may be associated with an LTE cell. In some aspects, the first base station 105-*a* or the second base station 105-*b* (or both) may facilitate communications between the UE 115-*a* and the other respective base station 105-*a*, 105-*b*. For example, upon establishing a connection with a cell supported by the UE 115-*a* via the communication link 205-*a*, the first base station 105-*a* may carry out communications with the UE 115-*a* to facilitate the establishment of a connection between the UE 115-*a* and a cell supported by the second base station 105-*b*.

Moreover, in some aspects, the first base station 105-*a* and the second base station 105-*b* may be associated with one or more subscriptions supported by the UE 115-*a*. For example, the UE 115-*a* may include a dual-SIM UE 115-*a* which supports a first subscription and a second subscription. In this example, the first base station 105-*a* may be associated with (e.g., support) the first subscription, and the second base station 105-*b* may be associated with (e.g., support) the second subscription.

In some aspects, the UE 115-*a* and the base stations 105-*a* and 105-*b* of the wireless communications system 200 may support communications to enable efficient post-call service recovery in the context of a dual-SIM UE 115-*a*. In particular, the wireless communications system 200 may support communications which enable the dual-SIM UE 115-*a* to perform (e.g., initiate or re-initiate) a network discovery procedure (e.g., radio access technology acquisition procedure) associated with a first subscription supported by the UE 115-*a* following the termination of a call performed by a second subscription supported by the UE 115-*a*. The network discovery procedure may prioritize higher-priority radio access technologies (e.g., NR) over lower-priority radio access technologies (e.g., LTE, 3G, 2G). By initiating (or re-initiating) the network discovery procedure after termination of the call, techniques described herein may facilitate fast and efficient NR service recovery by the UE 115-*a*, and prevent delays associated with NR service recovery experienced by some other wireless communications systems.

For example, the UE 115-*a* may include a dual-SIM UE 115-*a* or a multi-SIM UE 115-*a* which supports two or more subscriptions. The UE 115-*a* may establish a first wireless connection associated with a first subscription supported by the UE 115-*a*. In some cases, the UE 115-*a* may establish the first wireless connection associated with the first subscription using a first radio access technology (e.g., NR, 5G). In some aspects, the UE 115-*a* may establish the first wireless connection with a first cell supported by the first base station 105-*a*. For example, the first base station 105-*a* may support an NR cell, and the UE 115-*a* may establish the first wireless connection associated with the first subscription using the first radio access technology (e.g., NR, 5G).

In some aspects, the UE 115-*a* may establish the first wireless connection associated with the first subscription (e.g., first wireless connection with the first base station 105-*a*) while operating in a standalone mode of operation. For example, the UE 115-*a* may establish the first wireless connection using the first radio access technology while in a standalone mode of operation with respect to the first subscription. In some aspects, the UE 115-*a* may establish the first wireless connection with the first cell associated with the base station 105-*a* by performing an attachment procedure. For example, the UE 115-*a* may transmit an attachment request to the base station 105-*a* via the communication link 205-*a*, and the base station 105-*a* may transmit an attachment acknowledgement to the UE 115-*a* in response to the attachment request via the communication link 205-*a*.

The UE 115-*a* may additionally establish a second wireless connection associated with a second subscription supported by the UE 115-*a*. In some cases, the UE 115-*a* may establish the second wireless connection associated with the second subscription using a second radio access technology (e.g., LTE, 4G). In some aspects, the UE 115-*a* may establish the second wireless connection with a second cell supported by the second base station 105-*b*. For example, the second base station 105-*b* may support an LTE cell, and the UE 115-*a* may establish the second wireless connection associated with the second subscription using the second radio access technology (e.g., LTE, 4G). In some aspects, the UE 115-*a* may establish the second wireless connection with the second cell associated with the second base station 105-*b* by performing an attachment procedure. For example, the UE 115-*a* may transmit an attachment request to the base station 105-*b* via the communication link 205-*b*, and the base station 105-*b* may transmit an attachment acknowledgement to the UE 115-*b* in response to the attachment request via the communication link 205-*b*.

In some aspects, the first subscription and the second subscription supported by the UE 115-*a* may share common RF hardware resources of the UE 115-*a*. Additionally or alternatively, the first subscription and the second subscription supported by the UE 115-*a* may share common communication resources (e.g., time resources, frequency resources) for communicating over the respective wireless connections. For example, the UE 115-*a* may communicate over the first wireless connection via a set of communication resources based on establishing the first wireless connection. Additionally, the UE 115-*a* may communicate over the second wireless connection via the set of communication resources based on establishing the second wireless connection.

In some aspects, the UE 115-*a* may perform (e.g., setup) a protocol data unit (PDU) session over the first wireless connection. The UE 115-*a* may perform the PDU session over the first wireless connection with the first cell (e.g., base station 105-*a*). In some aspects, the UE 115-*a* may perform the PDU session via the first subscription. For example, the UE 115-*a* may perform a PDU session with the first cell in order to access a network (e.g., the internet) via the first subscription. In some aspects, the UE 115-*a* may perform the PDU session using the common set of communication resources utilized by the first subscription and the second subscription.

The UE 115-*a* may perform a call 210 (e.g., voice call) over the second wireless connection associated with the second subscription. In this regard, the UE 115-*a* may perform the call 210 with the second cell (e.g., the base station 105-*b*). The call 210 performed may include, but is not limited to, a VoLTE call, a CSFB call, or the like. In some aspects, the call 210 performed over the second wireless connection (e.g., communication link 205-b) may be performed using the common set of resources (e.g., common RF hardware resources, common time/frequency resources) utilized by the first subscription and the second subscription.

In some aspects, the UE 115-a may identify a loss of the first wireless connection associated with the first subscription. In this regard, the UE 115-a may identify a loss of the first wireless connection associated with the first cell (e.g., base station 105-a). In some cases, the UE 115-a may identify a loss of the first wireless connection based on performing the call 210 over the second wireless connection. For example, the call 210 performed via the second subscription may be performed using the common set of communication resources utilized by the first subscription and the second subscription, and may therefore terminate or otherwise interrupt the first wireless connection associated with the first subscription and the first cell. In some aspects, the UE 115-a may identify the loss of the first wireless connection based on messaging, signaling, or other indications exchanged between the two subscriptions supported by the UE 115-a.

The UE 115-a may initiate a network discovery procedure (e.g., radio access technology acquisition procedure) associated with the first subscription. In some aspects, the UE 115-a may initiate the network discovery procedure associated with the first subscription using the first radio access technology based on identifying the loss of the first wireless connection. For example, the UE 115-a may initiate the network discovery procedure using NR technology based on identifying the loss the first wireless connection. In some aspects, the UE 115-a may initiate the network discovery procedure prior to a termination of the call 210 over the second wireless connection.

In some aspects, the UE 115-a may perform (e.g., initiate) the network discovery procedure using the first radio access technology (e.g., NR, 5G). In this regard, the UE 115-s may prioritize the first radio access technology (e.g., NR, 5G) over lower-priority radio access technologies (e.g., LTE, 3G, 3G) when performing the network discovery procedure. For example, in cases where the first radio access technology includes NR technology, and the second radio access technology includes LTE technology, the UE 115-a may prioritize the NR technology over the LTE technology, and may thereby attempt to establish an NR wireless connection via the network discovery procedure prior to attempting to establish an LTE wireless connection via the network discovery procedure.

In some aspects, if the network discovery procedure fails to establish a connection using the first radio access technology, the UE 115-a may perform the network discovery procedure using lower-priority radio access technologies in order to establish a connection associated with the one or more of the lower-priority radio access technologies. In some aspects, the UE 115-a may be configured to cycle from the first radio access technology through lower-priority radio access technologies based on an attachment attempt counter, a timer, or both.

For example, the UE 115-a may initiate the network discovery using the first radio access technology (e.g., NR technology) based on identifying a loss of the first wireless connection. Upon initiating the network discovery procedure, the UE 115-a may initiate (e.g., start) an attachment attempt counter, a timer, or both. As the UE 115-a performs the network discovery procedure using the NR technology, the UE 115-a may increment the attachment attempt counter each time an attachment procedure is attempted. Moreover, the timer may be running as the UE 115-a performs the network discovery procedure using the NR technology. In some cases, the UE 115-a may determine that the attachment attempt counter satisfies a threshold counter, the timer satisfies a threshold time duration, or both. In some aspects, the attachment attempt counter may satisfy the threshold counter when the attachment attempt counter is equal to or greater than the threshold counter. Similarly, the timer may satisfy the threshold time duration when the timer has run for at least the threshold time duration. Upon determining that the attachment attempt counter satisfies the threshold counter, the timer satisfies the threshold time duration, or both, the UE 115-a may switch to the second radio access technology (e.g., LTE), and perform the network discovery procedure using the second radio access technology.

In this example, the UE 115-a may cycle (e.g., switch) from performing the network discovery procedure with the first radio access technology (e.g., NR) to the second radio access technology (e.g., LTE) based on the attachment attempt counter satisfying the threshold counter, the timer satisfying the threshold time duration, or both. In some aspects, the UE 115-a may re-initiate (e.g., reset) the attachment attempt counter, the timer, or both, based on performing the network discovery procedure with the second radio access technology. In a similar manner, the UE 115-a may cycle (e.g., switch) from performing the network discovery procedure with the second radio access technology (e.g., LTE) to a third radio access technology (e.g., 3G) and/or fourth radio access technology (e.g., 2G) based on the attachment attempt counter satisfying the threshold counter, the timer satisfying the threshold timer duration, or both.

The attachment attempt counter and/or the timer may be preconfigured by the UE 115-a, signaled to the UE 115-a via configuration signaling from a base station 105, or both. In some aspects, the various radio access technologies may exhibit the same or different attachment attempt counters and/or timers. For example, a first timer associated with first radio access technology (e.g., NR) may be longer than a second timer associated with the second radio access technology (e.g., LTE), thereby allowing the UE 115-a more time to establish an NR connection as opposed to the time allowed to establish an LTE connection.

In some aspects, the UE 115-a may terminate the call 210 (e.g., voice call) performed over the second wireless connection. For example, the UE 115-a may terminate the call 210 performed over the second wireless connection with the second cell via the second subscription. In some aspects, the terminating the call 210 may release the common set of communication resources used by the first subscription and the second subscription. In some aspects, the UE 115-a may be configured to determine the termination of the call 210 over the second wireless connection.

The UE 115-a may perform (e.g., initiate or re-initiate) a network discovery procedure based on identifying the loss of the first connection, the termination of the call 210, or any combination thereof. For example, the UE 115-a may perform the network discovery procedure associated with the first subscription using the first radio access technology based on identifying the loss of the first connection and the termination of the call 210 over the second wireless connection.

In some aspects, the UE 115-a may be said to initiate or re-initiate the network discovery procedure after termination of the call 210 based on whether or not the UE 115-a initiated the network discovery procedure prior to the termination of the call 210. For example, in cases where the UE 115-*a* did not initiate the network discovery procedure prior to the termination of the call 210 over the second wireless connection, the UE 115-*a* may initiate the network discovery procedure after termination of the call 210. Comparatively, in cases where the UE 115-*a* did initiate the network discovery procedure prior to termination of the call 210 over the second wireless connection, the UE 115-*a* may re-initiate (e.g., restart) the network discovery procedure after termination of the call 210. In cases where the UE 115-*a* re-initiates (e.g., restarts, resets) the network discovery procedure after termination of the call 210, the UE 115-*a* may re-initiate the network discovery procedure to perform the network discovery procedure using the first radio access technology (e.g., NR). Additionally, in cases where the UE 115-*a* re-initiates network discovery procedure after termination of the call 210, the UE 115-*a* may re-initiate (e.g., reset) the attachment attempt counter, the timer, or both, associated with the network discovery procedure. In this regard, the UE 115-*a* may reset the attachment attempt counter, the timer, or both, based on re-initiating the network discovery procedure after termination of the call 210.

As noted previously herein, upon initiating (or re-initiating) network discovery procedure after termination of the call 210, the UE 115-*a* may cycle (e.g., switch) between the various radio access technologies while performing the network discovery procedure based on the attachment attempt counter satisfying the threshold counter, the timer satisfying the threshold timer duration, or both. In this regard, the UE 115-*a* may first perform the network discovery procedure using the first radio access technology (e.g., NR), and may subsequently perform the network discovery procedure using lower-priority radio access technologies (e.g., LTE, 3G, 2G) if attempts to establish higher-priority connections are unsuccessful.

In some aspects, the UE 115-*a* may establish a wireless connection associated with the first subscription. In some cases, the UE 115-*a* may establish the third wireless connection associated with the first subscription using the first radio access technology (e.g., NR, 5G). For example, the UE 115-*a* may establish a wireless connection with the first cell supported by the first base station 105-*a* using the first radio access technology. By way of another example, the UE 115-*a* may establish a wireless connection with an additional cell supported by the first base station 105-*a* or another base station using the first radio access technology.

In cases where the UE 115-*a* fails to establish a connection via the network discovery procedure using the first radio access technology, the UE 115-*a* may establish a lower-priority connection using the second radio access technology (e.g., LTE) or another lower-priority radio access technology (e.g., 3G, 2G). In such cases, the UE 115-*a* may perform an attachment procedure using the first radio access technology after establishing the lower-priority connection. However, by initiating (or re-initiating) the network discovery procedure after termination of the call 210, the UE 115-*a* may significantly increase the probability of establishing a connection using the first radio access technology prior to establishing a connection with a lower-priority radio access technology.

Accordingly, initiating (or re-initiating) the network discovery procedure using the first radio access technology (e.g., NR) at 340 may enable the UE 115-*b* to establish a connection with a higher-priority radio access technology (e.g., NR) prior to establishing a connection with a lower-priority radio access technology (e.g., LTE, 3G, 2G). By preventing the UE 115-*a* from firstly establishing a connection with a lower-priority radio access technology (e.g., LTE, 3G, 2G), the techniques described herein may prevent delays in NR service recovery, thereby improving call 210 and leading to improved user experience.

Figure 3:
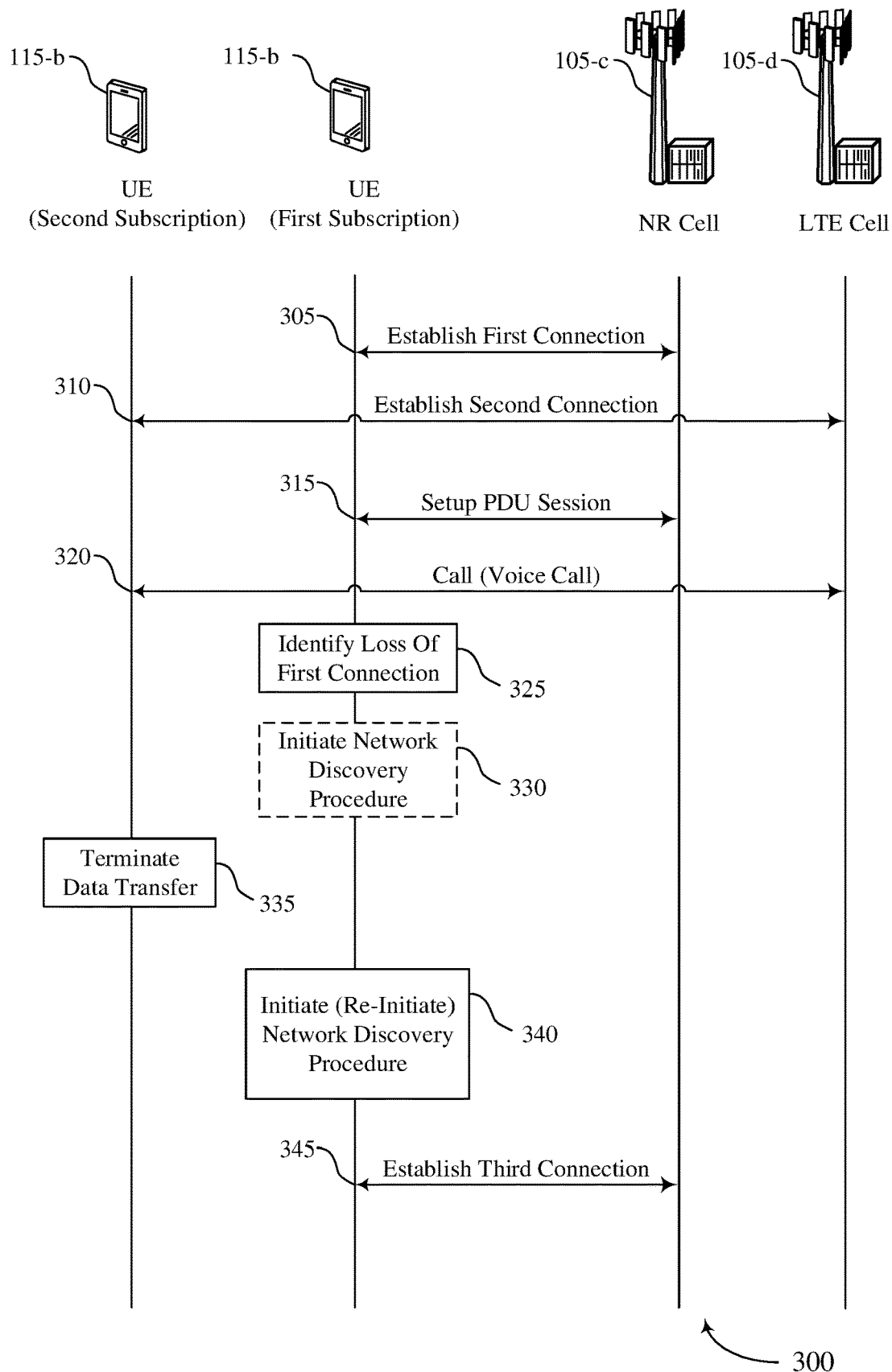
FIG. 3 illustrates an example of a process flow that supports techniques for post-call service recovery in dual SIM user equipment in accordance with aspects of the present disclosure.

FIG. 3 illustrates an example of a process flow 300 that supports techniques for post-call service recovery in dual SIM user equipment in accordance with aspects of the present disclosure. In some examples, process flow 300 may implement aspects of wireless communications system 100 or 200. For example, the process flow 300 may illustrate establishing a first wireless connection with a first cell associated with a first subscription, establishing a second wireless connection with a second cell associated with a second subscription, performing a call over the second wireless connection, and performing a network discovery procedure associated with the first subscription based on a termination of the call, as described with reference to FIGS. 1-2.

In some cases, process flow 300 may include a UE 115-*b*, a base station 105-*c*, and a base station 105-*d*, which may be examples of corresponding devices as described herein. In particular, the UE 115-*b* illustrated in FIG. 3 may be an example of the UE 115-*a* illustrated in FIG. 2. Similarly, the base station 105-*c* and the base station 105-*d* illustrated in FIG. 3 may be examples of the base station 105-*a* and the base station 105-*b*, respectively, illustrated in FIG. 2. Accordingly, in some cases, the base station 105-*c* may support a cell associated with a first radio access technology (e.g., NR cell), and the base station 105-*d* may support a cell associated with a second radio access technology (e.g., LTE cell).

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may establish a first wireless connection associated with a first subscription supported by the UE 115-*b*. In some cases, the UE 115-*b* may establish the first wireless connection associated with the first subscription using a first radio access technology (e.g., NR, 5G). In some cases, the UE 115-*b* may establish the first wireless connection with a first cell associated with the first radio access technology (e.g., NR cell, 5G cell). In some aspects, the UE 115-*b* may establish the first wireless connection with the first cell while operating in a standalone mode of operation. For example, the UE 115-*b* may establish the first wireless connection using the first radio access technology while in a standalone mode of operation with respect to the first subscription. In some aspects, the UE 115-*b* may establish the first wireless connection with the first cell associated with the base station 105-*c* by performing an attachment procedure. For example, the UE 115-*b* may transmit an attachment request to the base station 105-*c*, and the base station 105-*c* may transmit an attachment acknowledgement to the UE 115-*b* in response to the attachment request.

At 310, the UE 115-*b* may establish a second wireless connection associated with a second subscription supported by the UE 115-*b*. In some cases, the UE 115-*b* may establish the second wireless connection associated with the second subscription using a second radio access technology (e.g., LTE, 4G). In some cases, the UE 115-*b* may establish the second wireless connection with a second cell associated with the second radio access technology (e.g., LTE cell, 4G cell). In some aspects, the UE 115-*b* may establish the second wireless connection with the second cell associated with the base station 105-*d* by performing an attachment procedure. For example, the UE 115-*b* may transmit an attachment request to the base station 105-*d*, and the base station 105-*d* may transmit an attachment acknowledgement to the UE 115-*b* in response to the attachment request.

In some aspects, the first subscription and the second subscription supported by the UE 115-*b* may share common hardware resources of the UE 115-*b*. Additionally or alternatively, the first subscription and the second subscription supported by the UE 115-*b* may share common communication resources (e.g., time resources, frequency resources) for communicating over the respective wireless connections. For example, the UE 115-*b* may communicate with the first cell (e.g., base station 105-*c*) associated with the first subscription over the first wireless connection via a set of communication resources based on establishing the first wireless connection at 305. Additionally, the UE 115-*b* may communicate with the second cell (e.g., base station 105-*d*) associated with the second subscription over the second wireless connection via the set of communication resources based on establishing the second wireless connection at 310.

At 315, the UE 115-*b* may perform (e.g., setup) a PDU session over the first wireless connection. The UE 115-*b* may perform the PDU session over the first wireless connection with the first cell (e.g., base station 105-*c*). In some aspects, the UE 115-*b* may perform the PDU session via the first subscription. For example, the UE 115-*b* may perform a PDU session with the first cell in order to access a network (e.g., the internet) via the first subscription. In some aspects, the UE 115-*b* may perform the PDU session using the common set of communication resources utilized by the first subscription and the second subscription.

At 320, the UE 115-*b* may perform a call over the second wireless connection associated with the second subscription. In this regard, the UE 115-*b* may perform the call with the second cell (e.g., the base station 105-*d*). The UE 115-*b* may perform the call at 320 based on establishing the second wireless connection at 310. The call performed at 320 may include, but is not limited to, a VoLTE call, a CSFB call, or the like. In some aspects, the call (e.g., voice call) performed over the second wireless connection may be performed using the common set of resources utilized by the first subscription and the second subscription.

At 325, the UE 115-*b* may identify a loss of the first wireless connection associated with the first subscription. In this regard, the UE 115-*b* may identify a loss of the first wireless connection associated with the first cell (e.g., base station 105-*c*). In some cases, the UE 115-*b* may identify a loss of the first wireless connection based on performing the call over the second wireless connection. For example, the call performed via the second subscription at 320 may be performed using the common set of communication resources utilized by the first subscription and the second subscription, and may therefore terminate or otherwise interrupt the first wireless connection associated with the first subscription and the first cell. In some aspects, the UE 115-*b* may identify the loss of the first wireless connection based on messaging, signaling, or other indications exchanged between the two subscriptions supported by the UE 115-*b*.

At 330, the UE 115-*b* may initiate a network discovery procedure (e.g., radio access technology acquisition procedure) associated with the first subscription. In some aspects, the UE 115-*b* may initiate the network discovery procedure associated with the first subscription using the first radio access technology based on identifying the loss of the first wireless connection at 325. For example, the UE 115-*b* may initiate the network discovery procedure using NR technology based on identifying the loss the first wireless connection at 325. In some aspects, the UE 115-*b* may initiate the network discovery procedure at 330 prior to a termination of the call over the second wireless connection.

In some aspects, the UE 115-*b* may perform (e.g., initiate) the network discovery procedure using the first radio access technology (e.g., NR, 5G). In this regard, the UE 115-*b* may prioritize the first radio access technology (e.g., NR, 5G) over lower-priority radio access technologies (e.g., LTE, 3G, 3G) when performing the network discovery procedure. For example, in cases where the first radio access technology includes NR technology, and the second radio access technology includes LTE technology, the UE 115-*b* may prioritize the NR technology over the LTE technology, and may thereby attempt to establish an NR wireless connection via the network discovery procedure prior to attempting to establish an LTE wireless connection via the network discovery procedure.

In some aspects, if the network discovery procedure fails to establish a connection using the first radio access technology, the UE 115-*b* may perform the network discovery procedure using lower-priority radio access technologies in order to establish a connection associated with the one or more of the lower-priority radio access technologies. In some aspects, the UE 115-*b* may be configured to cycle from the first radio access technology through lower-priority radio access technologies based on an attachment attempt counter, a timer, or both.

For example, the UE 115-*b* may initiate the network discovery procedure at 330 using the first radio access technology (e.g., NR technology). Upon initiating the network discovery procedure, the UE 115-*b* may initiate an attachment attempt counter, a timer, or both. As the UE 115-*b* performs the network discovery procedure using the NR technology, the UE 115-*b* may increment the attachment attempt counter each time an attachment procedure is attempted. Moreover, the timer may be running as the UE 115-*b* performs the network discovery procedure using the NR technology. In some cases, the UE 115-*b* may determine that the attachment attempt counter satisfies a threshold counter, the timer satisfies a threshold time duration, or both. In some aspects, the attachment attempt counter may satisfy the threshold counter when the attachment attempt counter is equal to or greater than the threshold counter. Similarly, the timer may satisfy the threshold time duration when the timer has run for at least the threshold time duration. Upon determining that the attachment attempt counter satisfies the threshold counter, the timer satisfies the threshold time duration, or both, the UE 115-*b* may switch to the second radio access technology (e.g., LTE), and perform the network discovery procedure using the second radio access technology.

In this example, the UE 115-*b* may cycle (e.g., switch) from performing the network discovery procedure with the first radio access technology (e.g., NR) to the second radio access technology (e.g., LTE) based on the attachment attempt counter satisfying the threshold counter, the timer satisfying the threshold time duration, or both. In some aspects, the UE 115-*b* may re-initiate (e.g., reset) the attachment attempt counter, the timer, or both, based on performing the network discovery procedure with the second radio access technology. In a similar manner, the UE 115-*b* may cycle (e.g., switch) from performing the network discovery procedure with the second radio access technology (e.g., LTE) to a third radio access technology (e.g., 3G, 2G) based on the attachment attempt counter satisfying the threshold counter, the timer satisfying the threshold timer duration, or both.

The attachment attempt counter and/or the timer may be preconfigured by the UE 115-*b*, signaled to the UE 115-*b* via configuration signaling, or both. In some aspects, the various radio access technologies may exhibit the same or different attachment attempt counters and/or timers. For example, a first timer associated with first radio access technology (e.g., NR) may be longer than a second timer associated with the second radio access technology (e.g., LTE), thereby allowing the UE 115-*b* more time to establish an NR connection as opposed to the time allowed to establish an LTE connection.

At 335, the UE 115-*b* may terminate the call (e.g., voice call) performed over the second wireless connection. For example, the UE 115-*b* may terminate the call performed over the second wireless connection with the second cell via the second subscription. In some aspects, the terminating the call at 335 may release the common set of communication resources used by the first subscription and the second subscription. In some aspects, the UE 115-*b* may be configured to determine the termination of the call at 335.

At 340, the UE 115-*b* may perform (e.g., initiate or re-initiate) the network discovery procedure. In some aspects, the UE 115-*b* may perform the network discovery procedure based on identifying the loss of the first connection at 325, the termination of the call at 335, or any combination thereof. For example, the UE 115-*b* may perform the network discovery procedure associated with the first subscription using the first radio access technology based on identifying the loss of the first connection at 325 and the termination of the call at 335.

The UE 115-*b* may initiate or re-initiate the network discovery procedure at 340 based on whether or not the UE 115-*b* initiated the network discovery procedure at 330. For example, in cases where the UE 115-*b* did not initiate the network discovery procedure at 330, the UE 115-*b* may initiate the network discovery procedure at 340. Comparatively, in cases where the UE 115-*b* did initiate the network discovery procedure at 330, the UE 115-*b* may re-initiate (e.g., restart) the network discovery procedure at 340. In cases where the UE 115-*b* re-initiates (e.g., restarts, resets) network discovery procedure at 340, the UE 115-*b* may re-initiate the network discovery procedure to perform the network discovery procedure using the first radio access technology (e.g., NR). Additionally, in cases where the UE 115-*b* re-initiates network discovery procedure at 340, the UE 115-*b* may re-initiate (e.g., reset) the attachment attempt counter, the timer, or both, associated with the network discovery procedure. In some aspects, the UE 115-*b* may reset the attachment attempt counter, the timer, or both, based on re-initiating the network discovery procedure at 340.

As noted previously herein, upon initiating (or re-initiating) network discovery procedure at 340, the UE 115-*b* may cycle (e.g., switch) between the various radio access technologies while performing the network discovery procedure based on the attachment attempt counter satisfying the threshold counter, the timer satisfying the threshold timer duration, or both. In this regard, the UE 115-*b* may first perform the network discovery procedure using the first radio access technology (e.g., NR), and may subsequently perform the network discovery procedure using lower-priority radio access technologies (e.g., LTE, 3G, 2G) if attempts to establish higher-priority connections are unsuccessful.

At 345, the UE 115-*b* may establish a third wireless connection associated with the first subscription. In some cases, the UE 115-*b* may establish the third wireless connection associated with the first subscription using the first radio access technology (e.g., NR, 5G). For example, the UE 115-*b* may establish the third wireless connection associated with the first subscription at 345 based on performing the network discovery procedure using the first radio access technology at 340.

Initiating (or re-initiating) the network discovery procedure using the first radio access technology (e.g., NR) at 340 may enable the UE 115-*b* to establish a connection with a higher-priority radio access technology (e.g., NR) prior to establishing a connection with a lower-priority radio access technology (e.g., LTE, 3G, 2G). By preventing the UE 115-*b* from firstly establishing a connection with a lower-priority radio access technology (e.g., LTE, 3G, 2G), the techniques described herein may prevent delays in NR service recovery, thereby improving call and leading to improved user experience.

Figure 4:
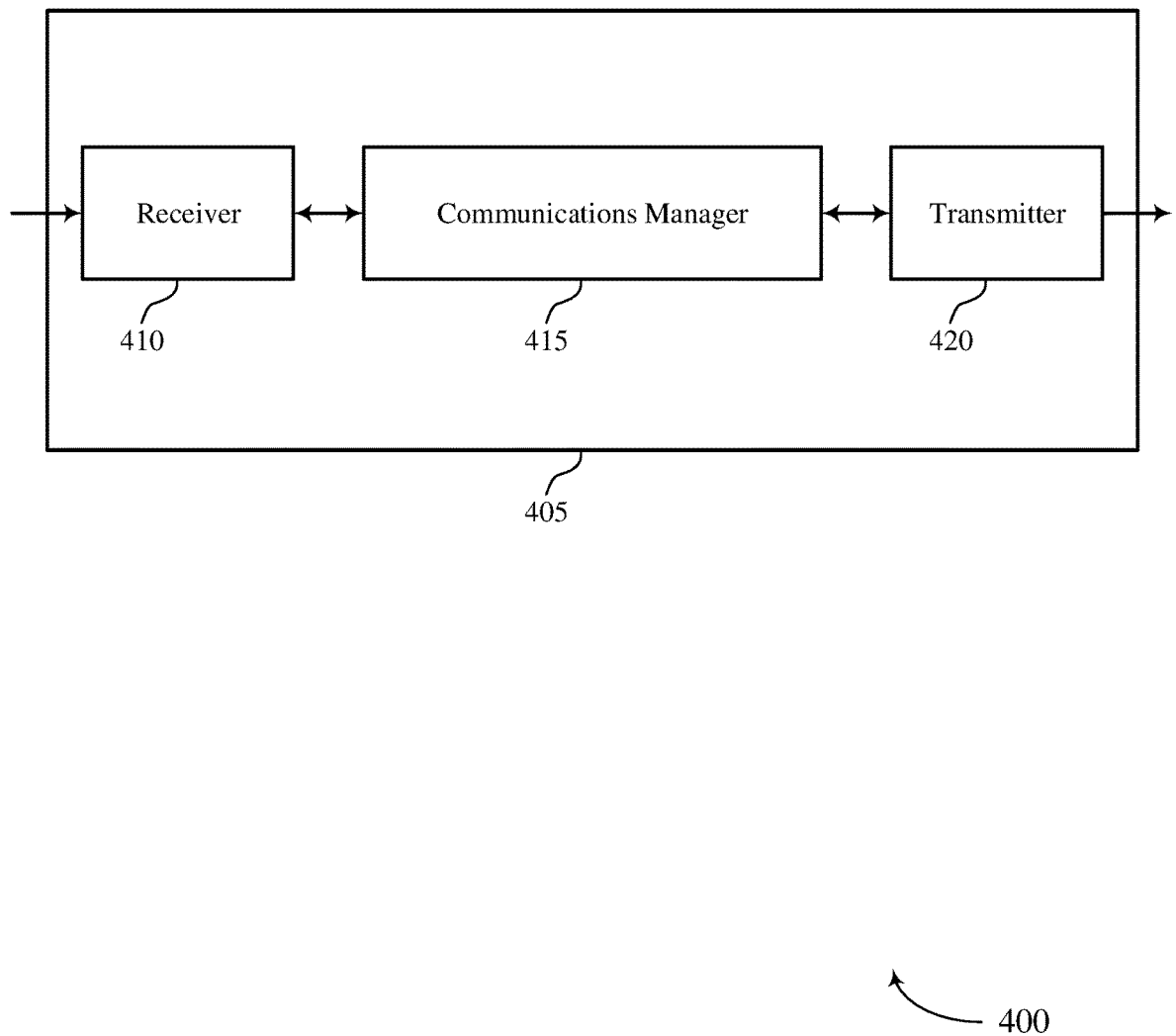
FIGS. 4 and 5 show block diagrams of devices that support techniques for post-call service recovery in dual SIM user equipment in accordance with aspects of the present disclosure.

FIG. 4 shows a block diagram 400 of a device 405 that supports techniques for post-call service recovery in dual SIM user equipment in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for post-call service recovery in dual SIM user equipment, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may establish a first wireless connection associated with a first subscription using a first radio access technology, identify a loss of the first wireless connection based on performing the call over the second wireless connection, establish a second wireless connection associated with a second subscription using a second radio access technology, perform a call over the second wireless connection, and perform a network discovery procedure associated with the first subscription using the first radio access technology based on the loss of the first wireless connection and a termination of the call over the second wireless connection. The communications manager 415 may be an example of aspects of the communications manager 710 described herein.

The actions performed by the communications manager 415 as described herein may be implemented to realize one or more potential advantages. For example, performing a network discovery procedure associated with a first subscription using a first radio access technology (e.g., NR) after a termination of call associated with a second subscription may enable the UE 115 to quickly and efficiently re-establish NR service. In particular, by preventing the UE 115 from firstly establishing a connection with a lower-priority radio access technology (e.g., LTE, 3G, 2G), the communications manager 415 may prevent delays in in NR service recovery, thereby improving call and leading to improved user experience with the UE 115.

Based on performing a network discovery procedure associated with a first subscription using a first radio access technology (e.g., NR) after a termination of call associated with a second subscription, a processor of the UE 115 (e.g., a processor controlling the receiver 410, the communications manager 415, the transmitter 420, etc.) may reduce processing resources used for attachment procedures. For example, by establishing an NR connection prior to establishing an LTE, 3G, or 2G connection, the quantity of attachment procedures may be reduced. Subsequently, the processor of the UE 115 may reduce the number of retransmissions and signaling resources used by the UE 115, correspondingly reducing a number of times the processor ramps up processing power and turns on processing units to handle uplink transmission and/or downlink reception.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
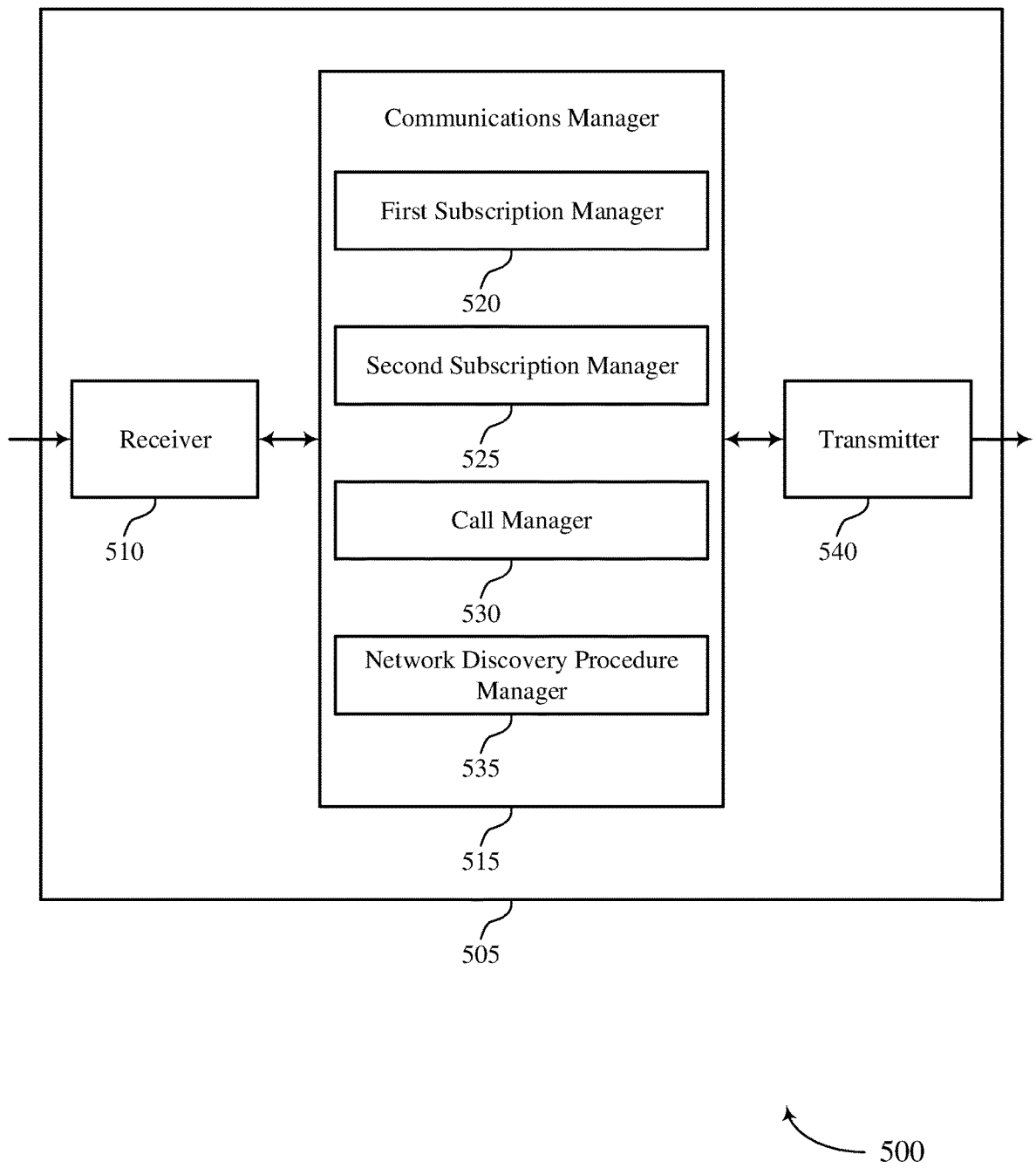

FIG. 5 shows a block diagram 500 of a device 505 that supports techniques for post-call service recovery in dual SIM user equipment in accordance with aspects of the present disclosure. The device 505 may be an example of aspects of a device 405, or a UE 115 as described herein. The device 505 may include a receiver 510, a communications manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to techniques for post-call service recovery in dual SIM user equipment, etc.). Information may be passed on to other components of the device 505.

The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a first subscription manager 520, a second subscription manager 525, a call manager 530, and a network discovery procedure manager 535. The communications manager 515 may be an example of aspects of the communications manager 710 described herein.

The first subscription manager 520 may establish a first wireless connection associated with a first subscription using a first radio access technology and identify a loss of the first wireless connection based on performing the call over the second wireless connection. The second subscription manager 525 may establish a second wireless connection associated with a second subscription using a second radio access technology.

The call manager 530 may perform a call over the second wireless connection. The network discovery procedure manager 535 may perform a network discovery procedure associated with the first subscription using the first radio access technology based on the loss of the first wireless connection and a termination of the call over the second wireless connection.

The transmitter 540 may transmit signals generated by other components of the device 505. In some examples, the transmitter 540 may be collocated with a receiver 510 in a transceiver module. For example, the transmitter 540 may be an example of aspects of the transceiver 720 described with reference to FIG. 7. The transmitter 540 may utilize a single antenna or a set of antennas.

Figure 6:
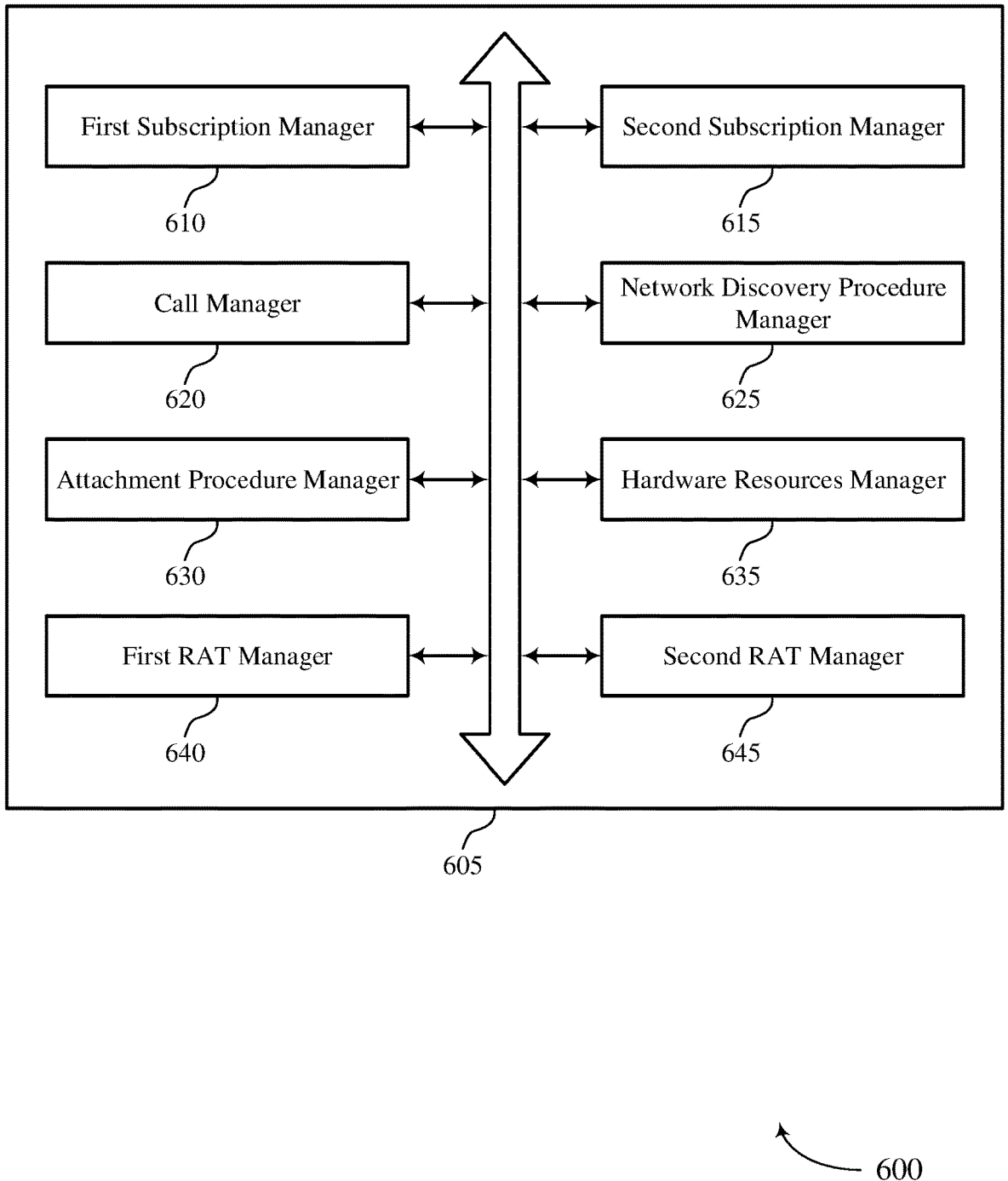
FIG. 6 shows a block diagram of a communications manager that supports techniques for post-call service recovery in dual SIM user equipment in accordance with aspects of the present disclosure.

FIG. 6 shows a block diagram 600 of a communications manager 605 that supports techniques for post-call service recovery in dual SIM user equipment in accordance with aspects of the present disclosure. The communications manager 605 may be an example of aspects of a communications manager 415, a communications manager 515, or a communications manager 710 described herein. The communications manager 605 may include a first subscription manager 610, a second subscription manager 615, a call manager 620, a network discovery procedure manager 625, an attachment procedure manager 630, a hardware resources manager 635, a first RAT manager 640, and a second RAT manager 645. Each of these modules may communicate, directly or indirectly, with one another (e.g., via one or more buses).

The first subscription manager 610 may establish a first wireless connection associated with a first subscription using a first radio access technology.

In some examples, the first subscription manager 610 may identify a loss of the first wireless connection based on performing the call over the second wireless connection. In some examples, the first subscription manager 610 may establish a third wireless connection associated with the first subscription using the first radio access technology based on performing the network discovery procedure using the first radio access technology. In some examples, the first subscription manager 610 may communicate over the first wireless connection associated with the first subscription using a set of communication resources based on establishing the first wireless connection.

The second subscription manager 615 may establish a second wireless connection associated with a second subscription using a second radio access technology. In some examples, the second subscription manager 615 may perform the call over the second wireless connection using the set of communication resources, where identifying the loss of the first wireless connection is based on performing the call over the second wireless connection using the set of communication resources.

The call manager 620 may perform a call over the second wireless connection. In some examples, performing the call over the second wireless connection includes performing a VOLTE call, or a CSFB call.

The network discovery procedure manager 625 may perform a network discovery procedure associated with the first subscription using the first radio access technology based on the loss of the first wireless connection and a termination of the call over the second wireless connection. In some examples, the network discovery procedure manager 625 may initiate the network discovery procedure associated with the first subscription using the first radio access technology based on the loss of the first wireless connection, where the network discovery procedure is initiated prior to the termination of the call over the second wireless connection. In some examples, performing the network discovery procedure based on the loss of the first wireless connection and the termination of the call over the second wireless connection includes re-initiating the network discovery procedure after the termination of the call over the second wireless connection.

In some examples, the network discovery procedure manager 625 may initiate an attachment attempt counter, a timer, or both, based on initiating the network discovery procedure. In some examples, the network discovery procedure manager 625 may perform the network discovery procedure using the second radio access technology based on the attachment attempt counter satisfying a threshold counter, the timer satisfying a threshold time duration, or both. In some examples, the network discovery procedure manager 625 may reset the attachment attempt counter, the timer, or both, based on re-initiating the network discovery procedure after the termination of the call over the second wireless connection.

The attachment procedure manager 630 may perform an attachment procedure with a cell associated with the first subscription while operating in a standalone mode of operation, where establishing the first wireless connection is based on performing the attachment procedure.

The hardware resources manager 635 may manage the radio frequency hardware resources for communicating via the first subscription and the second subscription.

In some cases, the first wireless connection associated with the first subscription is established using a set of radio frequency hardware resources of the UE, and the second wireless connection associated with the second subscription is established using the set of radio frequency hardware resources of the UE.

The first RAT manager 640 may manage communications carried out over the first radio access technology (e.g., NR, 5G). In some cases, the first radio access technology includes a new radio technology, a fifth generation (5G) technology, or both. The second RAT manager 645 may manage communications carried out over the second radio access technology (e.g., LTE, 4G). In some cases, the second radio access technology includes a long term evolution technology, a fourth generation (4G) technology, or both.

Figure 7:
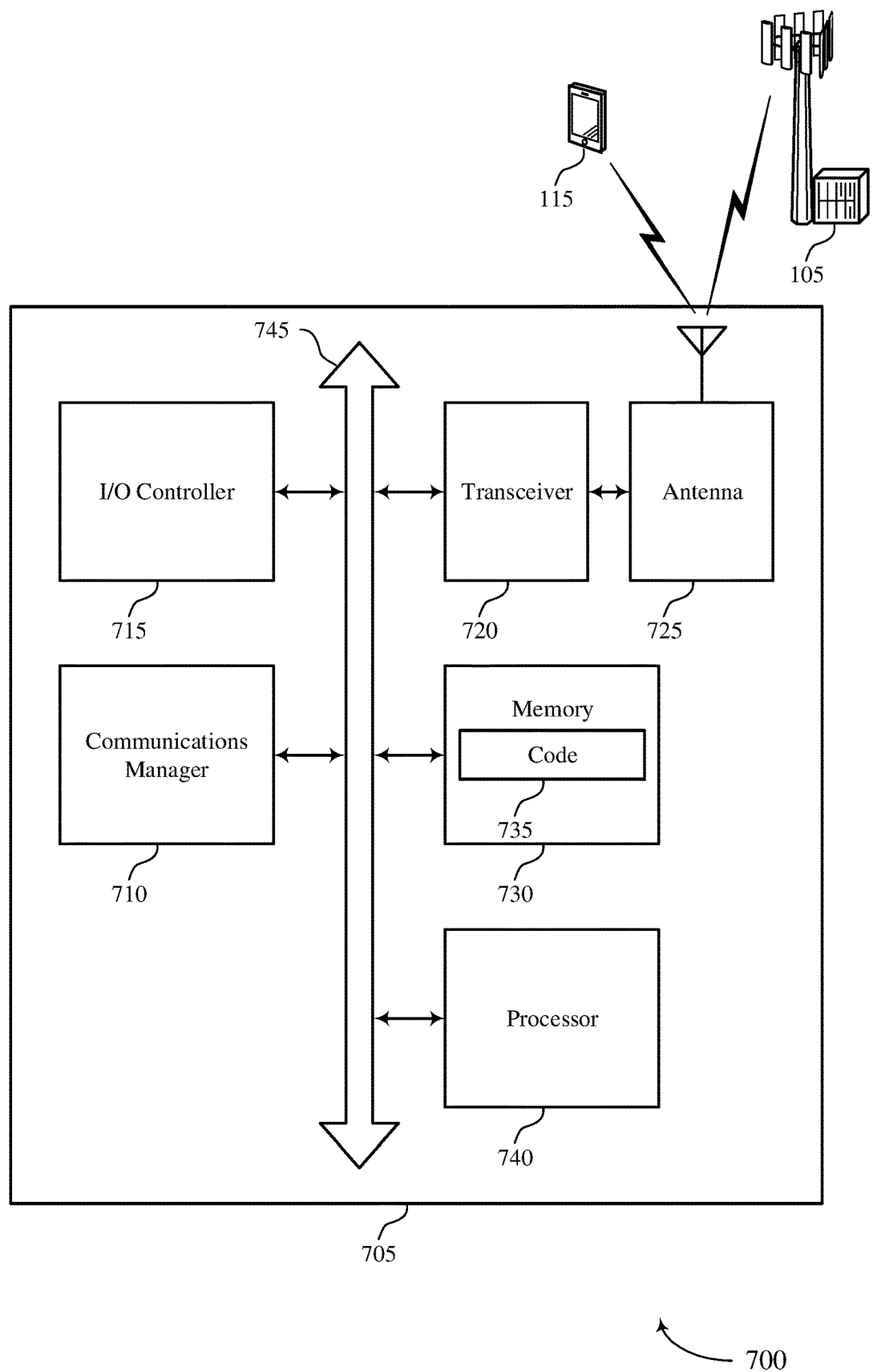
FIG. 7 shows a diagram of a system including a device that supports techniques for post-call service recovery in dual SIM user equipment in accordance with aspects of the present disclosure.

FIG. 7 shows a diagram of a system 700 including a device 705 that supports techniques for post-call service recovery in dual SIM user equipment in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may establish a first wireless connection associated with a first subscription using a first radio access technology, identify a loss of the first wireless connection based on performing the call over the second wireless connection, establish a second wireless connection associated with a second subscription using a second radio access technology, perform a call over the second wireless connection, and perform a network discovery procedure associated with the first subscription using the first radio access technology based on the loss of the first wireless connection and a termination of the call over the second wireless connection.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for post-call service recovery in dual SIM user equipment).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
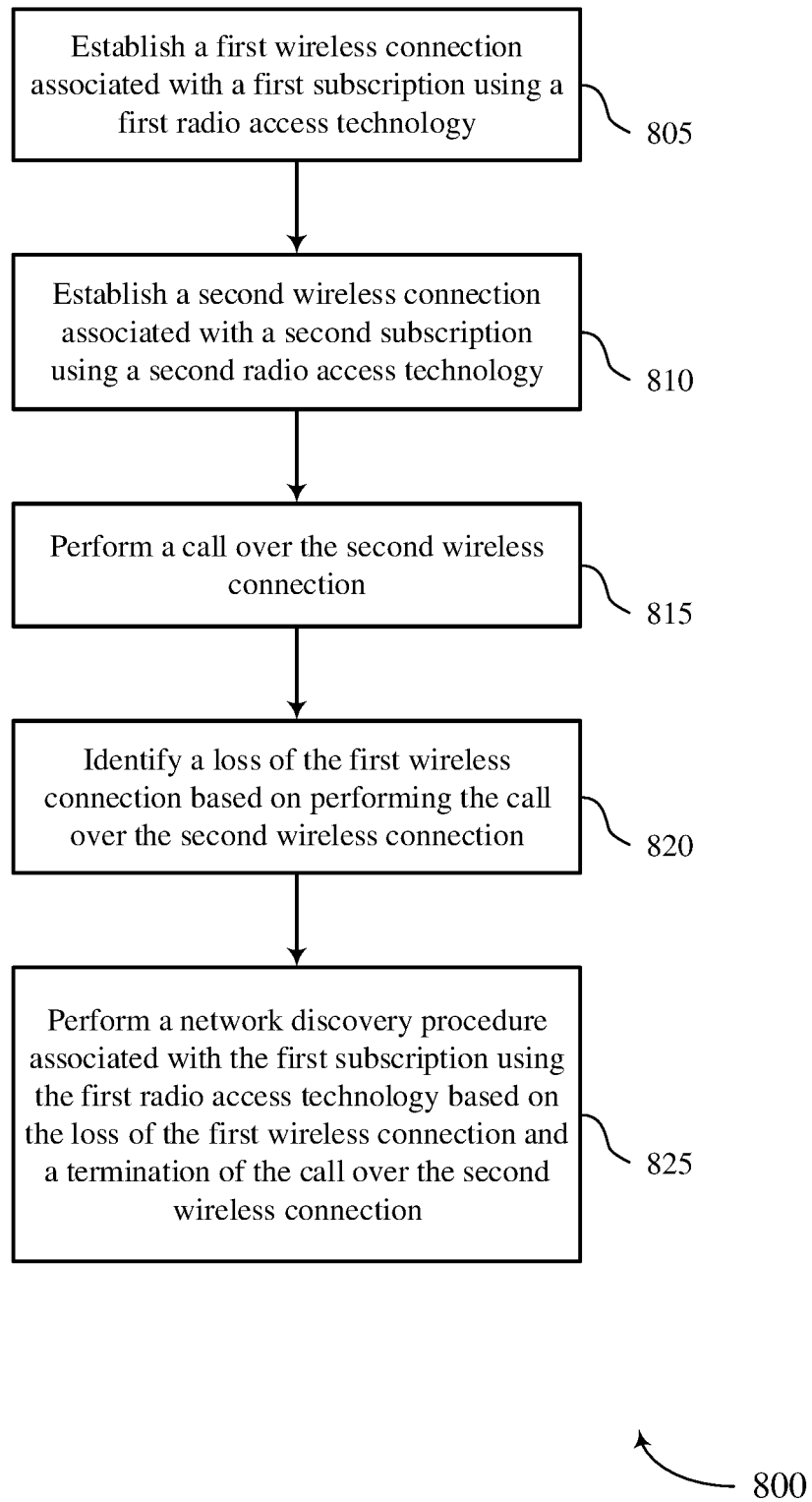
FIGS. 8 through 10 show flowcharts illustrating methods that support techniques for post-call service recovery in dual SIM user equipment in accordance with aspects of the present disclosure.

FIG. 8 shows a flowchart illustrating a method 800 that supports techniques for post-call service recovery in dual SIM user equipment in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 805, the UE may establish a first wireless connection associated with a first subscription using a first radio access technology. The operations of 805 may be performed according to the methods described herein. In some examples, aspects of the operations of 805 may be performed by a first subscription manager as described with reference to FIGS. 4 through 7.

At 810, the UE may establish a second wireless connection associated with a second subscription using a second radio access technology. The operations of 810 may be performed according to the methods described herein. In some examples, aspects of the operations of 810 may be performed by a second subscription manager as described with reference to FIGS. 4 through 7.

At 815, the UE may perform a call over the second wireless connection. The operations of 815 may be performed according to the methods described herein. In some examples, aspects of the operations of 815 may be performed by a call manager as described with reference to FIGS. 4 through 7.

At 820, the UE may identify a loss of the first wireless connection based on performing the call over the second wireless connection. The operations of 820 may be performed according to the methods described herein. In some examples, aspects of the operations of 820 may be performed by a first subscription manager as described with reference to FIGS. 4 through 7.

At 825, the UE may perform a network discovery procedure associated with the first subscription using the first radio access technology based on the loss of the first wireless connection and a termination of the call over the second wireless connection. The operations of 825 may be performed according to the methods described herein. In some examples, aspects of the operations of 825 may be performed by a network discovery procedure manager as described with reference to FIGS. 4 through 7.

Figure 9:
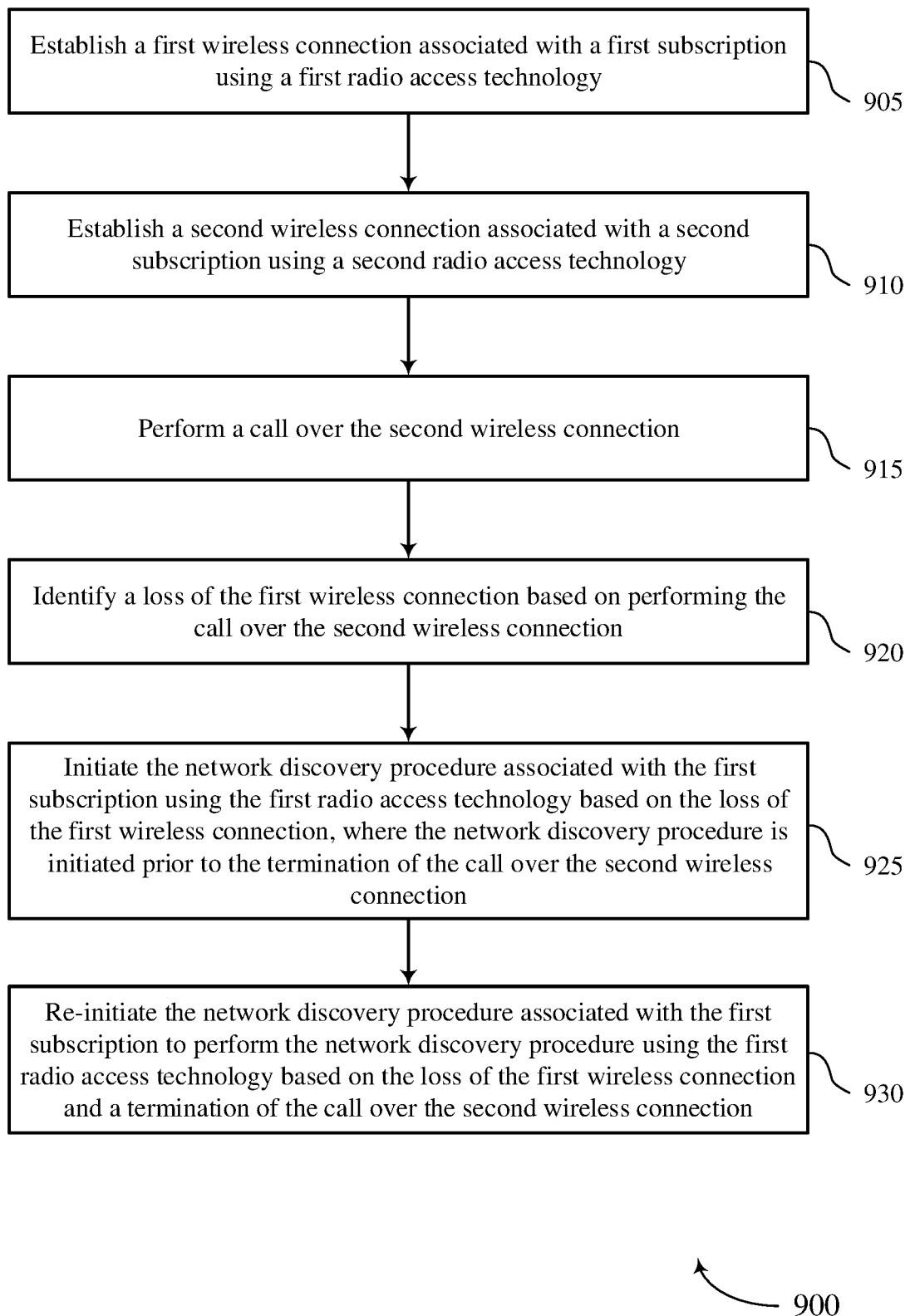

FIG. 9 shows a flowchart illustrating a method 900 that supports techniques for post-call service recovery in dual SIM user equipment in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 905, the UE may establish a first wireless connection associated with a first subscription using a first radio access technology. The operations of 905 may be performed according to the methods described herein. In some examples, aspects of the operations of 905 may be performed by a first subscription manager as described with reference to FIGS. 4 through 7.

At 910, the UE may establish a second wireless connection associated with a second subscription using a second radio access technology. The operations of 910 may be performed according to the methods described herein. In some examples, aspects of the operations of 910 may be performed by a second subscription manager as described with reference to FIGS. 4 through 7.

At 915, the UE may perform a call over the second wireless connection. The operations of 915 may be performed according to the methods described herein. In some examples, aspects of the operations of 915 may be performed by a call manager as described with reference to FIGS. 4 through 7.

At 920, the UE may identify a loss of the first wireless connection based on performing the call over the second wireless connection. The operations of 920 may be performed according to the methods described herein. In some examples, aspects of the operations of 920 may be performed by a first subscription manager as described with reference to FIGS. 4 through 7.

At 925, the UE may initiate the network discovery procedure associated with the first subscription using the first radio access technology based on the loss of the first wireless connection, where the network discovery procedure is initiated prior to the termination of the call over the second wireless connection. The operations of 925 may be performed according to the methods described herein. In some examples, aspects of the operations of 925 may be performed by a network discovery procedure manager as described with reference to FIGS. 4 through 7.

At 930, the UE may re-initiate the network discovery procedure associated with the first subscription to perform the network discovery procedure using the first radio access technology based on the loss of the first wireless connection and a termination of the call over the second wireless connection. The operations of 930 may be performed according to the methods described herein. In some examples, aspects of the operations of 930 may be performed by a network discovery procedure manager as described with reference to FIGS. 4 through 7.

Figure 10:
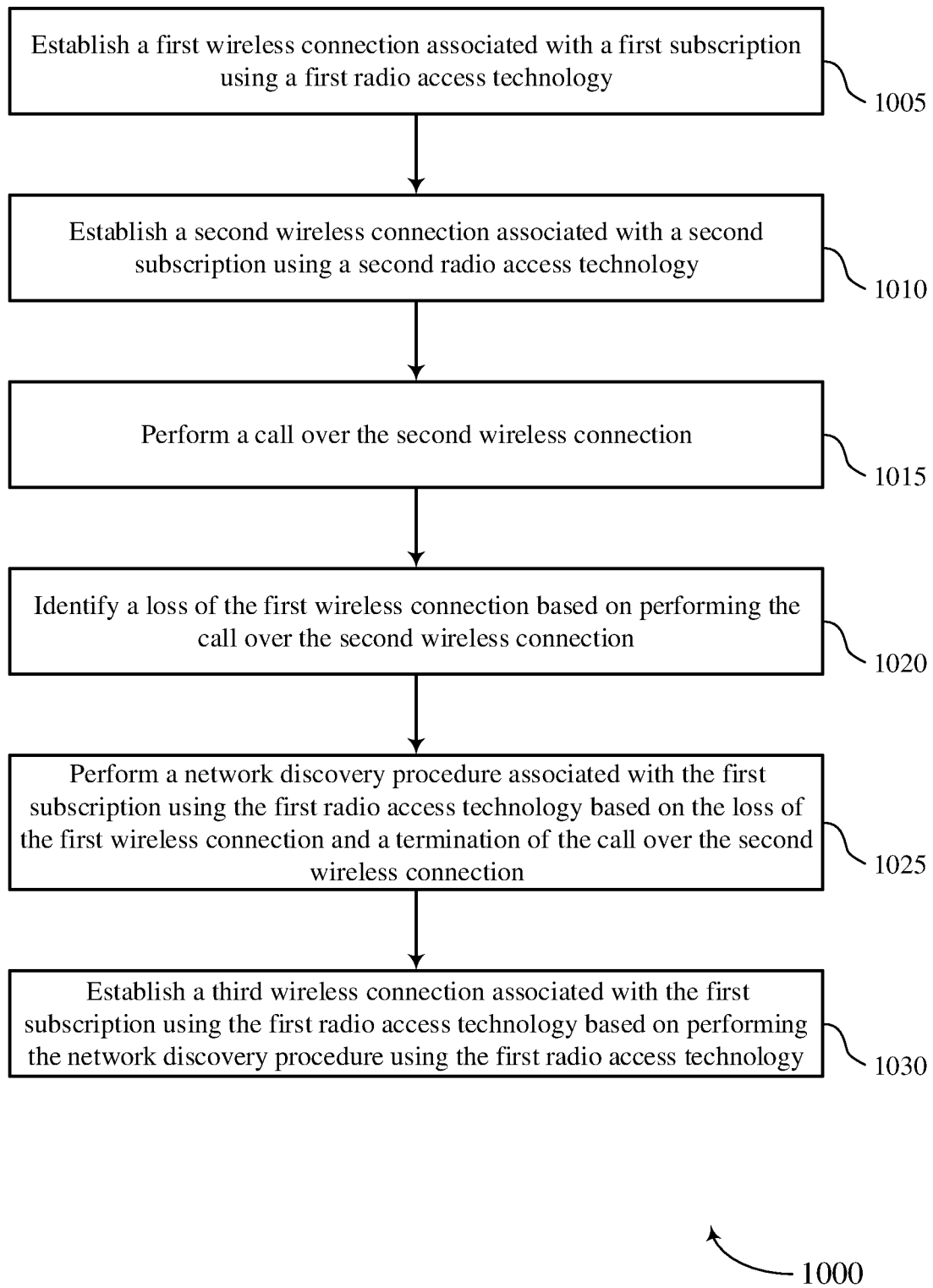

FIG. 10 shows a flowchart illustrating a method 1000 that supports techniques for post-call service recovery in dual SIM user equipment in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described below.

Additionally or alternatively, a UE may perform aspects of the functions described below using special-purpose hardware.

At 1005, the UE may establish a first wireless connection associated with a first subscription using a first radio access technology. The operations of 1005 may be performed according to the methods described herein. In some examples, aspects of the operations of 1005 may be performed by a first subscription manager as described with reference to FIGS. 4 through 7.

At 1010, the UE may establish a second wireless connection associated with a second subscription using a second radio access technology. The operations of 1010 may be performed according to the methods described herein. In some examples, aspects of the operations of 1010 may be performed by a second subscription manager as described with reference to FIGS. 4 through 7.

At 1015, the UE may perform a call over the second wireless connection. The operations of 1015 may be performed according to the methods described herein. In some examples, aspects of the operations of 1015 may be performed by a call manager as described with reference to FIGS. 4 through 7.

At 1020, the UE may identify a loss of the first wireless connection based on performing the call over the second wireless connection. The operations of 1020 may be performed according to the methods described herein. In some examples, aspects of the operations of 1020 may be performed by a first subscription manager as described with reference to FIGS. 4 through 7.

At 1025, the UE may perform a network discovery procedure associated with the first subscription using the first radio access technology based on the loss of the first wireless connection and a termination of the call over the second wireless connection. The operations of 1025 may be performed according to the methods described herein. In some examples, aspects of the operations of 1025 may be performed by a network discovery procedure manager as described with reference to FIGS. 4 through 7.

At 1030, the UE may establish a third wireless connection associated with the first subscription using the first radio access technology based on performing the network discovery procedure using the first radio access technology. The operations of 1030 may be performed according to the methods described herein. In some examples, aspects of the operations of 1030 may be performed by a first subscription manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   establishing a first wireless connection associated with a first subscription using a first radio access technology;
   establishing a second wireless connection associated with a second subscription using a second radio access technology;
   performing a call over the second wireless connection;
   identifying a loss of the first wireless connection based at least in part on performing the call over the second wireless connection;
   initiating a network discovery procedure associated with the first subscription using the first radio access technology based at least in part on the loss of the first wireless connection, wherein the network discovery procedure is initiated prior to the termination of the call over the second wireless connection; and
   re-initiating the network discovery procedure associated with the first subscription using the first radio access technology based at least in part on the loss of the first wireless connection after the termination of the call over the second wireless connection.

2. The method of claim 1, further comprising:
   initiating an attachment attempt counter, a timer, or both, based at least in part on initiating the network discovery procedure; and
   performing the network discovery procedure using the second radio access technology based at least in part on the attachment attempt counter satisfying a threshold counter, the timer satisfying a threshold time duration, or both.

3. The method of claim 2, further comprising:
   resetting the attachment attempt counter, the timer, or both, based at least in part on re-initiating the network discovery procedure after the termination of the call over the second wireless connection.

4. The method of claim 1, further comprising:
   establishing a third wireless connection associated with the first subscription using the first radio access technology based at least in part on performing the network discovery procedure using the first radio access technology.

5. The method of claim 1, further comprising:
   performing an attachment procedure with a cell associated with the first subscription while operating in a stand-alone mode of operation, wherein establishing the first wireless connection is based at least in part on performing the attachment procedure.

6. The method of claim 1, further comprising:
   communicating over the first wireless connection associated with the first subscription using a set of communication resources based at least in part on establishing the first wireless connection; and
   performing the call over the second wireless connection using the set of communication resources, wherein identifying the loss of the first wireless connection is based at least in part on performing the call over the second wireless connection using the set of communication resources.

7. The method of claim 1, wherein the first wireless connection associated with the first subscription is established using a set of radio frequency hardware resources of the UE, and the second wireless connection associated with the second subscription is established using the set of radio frequency hardware resources of the UE.

8. The method of claim 1, wherein:
   performing the call over the second wireless connection comprises performing a voice over long term evolution (LTE) call, or a circuit-switched fallback call.

9. The method of claim 1, wherein:
   the first radio access technology comprises a new radio technology, a fifth generation (5G) technology, or both; and
   the second radio access technology comprises a long term evolution technology, a fourth generation (4G) technology, or both.

10. An apparatus for wireless communication at a user equipment (UE), comprising:
    a processor, memory coupled with the processor; and
    instructions stored in the memory and executable by the processor to cause the apparatus to:
      establish a first wireless connection associated with a first subscription using a first radio access technology;
      establish a second wireless connection associated with a second subscription using a second radio access technology;
      perform a call over the second wireless connection;

initiate a network discovery procedure associated with the first subscription using the first radio access technology based at least in part on the loss of the first wireless connection, wherein the network discovery procedure is initiated prior to the termination of the call over the second wireless connection; and
re-initiate the network discovery procedure associated with the first subscription using the first radio access technology based at least in part on the loss of the first wireless connection after the termination of the call over the second wireless connection.

11. The apparatus of claim 10, wherein the instructions are further executable by the processor to cause the apparatus to:
initiate an attachment attempt counter, a timer, or both, based at least in part on initiating the network discovery procedure; and
perform the network discovery procedure using the second radio access technology based at least in part on the attachment attempt counter satisfying a threshold counter, the timer satisfying a threshold time duration, or both.

12. The apparatus of claim 11, wherein the instructions are further executable by the processor to cause the apparatus to:
reset the attachment attempt counter, the timer, or both, based at least in part on re-initiating the network discovery procedure after the termination of the call over the second wireless connection.

13. The apparatus of claim 10, wherein the instructions are further executable by the processor to cause the apparatus to:
establish a third wireless connection associated with the first subscription using the first radio access technology based at least in part on performing the network discovery procedure using the first radio access technology.

14. The apparatus of claim 10, wherein the instructions are further executable by the processor to cause the apparatus to:
perform an attachment procedure with a cell associated with the first subscription while operating in a standalone mode of operation, wherein establishing the first wireless connection is based at least in part on performing the attachment procedure.

15. The apparatus of claim 10, wherein the instructions are further executable by the processor to cause the apparatus to:
communicate over the first wireless connection associated with the first subscription using a set of communication resources based at least in part on establishing the first wireless connection; and
perform the call over the second wireless connection using the set of communication resources, wherein identifying the loss of the first wireless connection is based at least in part on performing the call over the second wireless connection using the set of communication resources.

16. The apparatus of claim 10, wherein the first wireless connection associated with the first subscription is established using a set of radio frequency hardware resources of the UE, and the second wireless connection associated with the second subscription is established using the set of radio frequency hardware resources of the UE.

17. The apparatus of claim 10, wherein the instructions to perform the call over the second wireless connection are executable by the processor to cause the apparatus to perform a voice over long term evolution (LTE) call, or a circuit-switched fallback call.

18. The apparatus of claim 10, wherein:
the first radio access technology comprises a new radio technology, a fifth generation (5G) technology, or both; and
the second radio access technology comprises a long term evolution technology, a fourth generation (4G) technology, or both.

19. An apparatus for wireless communication at a user equipment (UE), comprising:
means for establishing a first wireless connection associated with a first subscription using a first radio access technology;
means for establishing a second wireless connection associated with a second subscription using a second radio access technology;
means for performing a call over the second wireless connection;
means for initiating a network discovery procedure associated with the first subscription using the first radio access technology based at least in part on the loss of the first wireless connection, wherein the network discovery procedure is initiated prior to the termination of the call over the second wireless connection; and
means for re-initiating the network discovery procedure associated with the first subscription using the first radio access technology based at least in part on the loss of the first wireless connection after the termination of the call over the second wireless connection.

20. The apparatus of claim 19, further comprising:
means for initiating an attachment attempt counter, a timer, or both, based at least in part on initiating the network discovery procedure; and
means for performing the network discovery procedure using the second radio access technology based at least in part on the attachment attempt counter satisfying a threshold counter, the timer satisfying a threshold time duration, or both.

21. The apparatus of claim 20, further comprising:
means for resetting the attachment attempt counter, the timer, or both, based at least in part on re-initiating the network discovery procedure after the termination of the call over the second wireless connection.

22. The apparatus of claim 19, further comprising:
means for establishing a third wireless connection associated with the first subscription using the first radio access technology based at least in part on performing the network discovery procedure using the first radio access technology.

23. The apparatus of claim 19, further comprising:
means for performing an attachment procedure with a cell associated with the first subscription while operating in a standalone mode of operation, wherein establishing the first wireless connection is based at least in part on performing the attachment procedure.

24. The apparatus of claim 19, further comprising:
means for communicating over the first wireless connection associated with the first subscription using a set of communication resources based at least in part on establishing the first wireless connection; and
means for performing the call over the second wireless connection using the set of communication resources, wherein identifying the loss of the first wireless connection is based at least in part on performing the call over the second wireless connection using the set of communication resources.

25. The apparatus of claim 19, wherein the first wireless connection associated with the first subscription is established using a set of radio frequency hardware resources of the UE, and the second wireless connection associated with the second subscription is established using the set of radio frequency hardware resources of the UE.

26. The apparatus of claim 19, wherein the means for performing the call over the second wireless connection comprises means for performing a voice over long term evolution (LTE) call, or a circuit-switched fallback call.

27. The apparatus of claim 19, wherein:
the first radio access technology comprises a new radio technology, a fifth generation (5G) technology, or both; and
the second radio access technology comprises a long term evolution technology, a fourth generation (4G) technology, or both.

* * * * *